May 9, 1933. O. U. ZERK 1,908,468
LUBRICATING APPARATUS
Filed Jan. 24, 1929 2 Sheets-Sheet 2
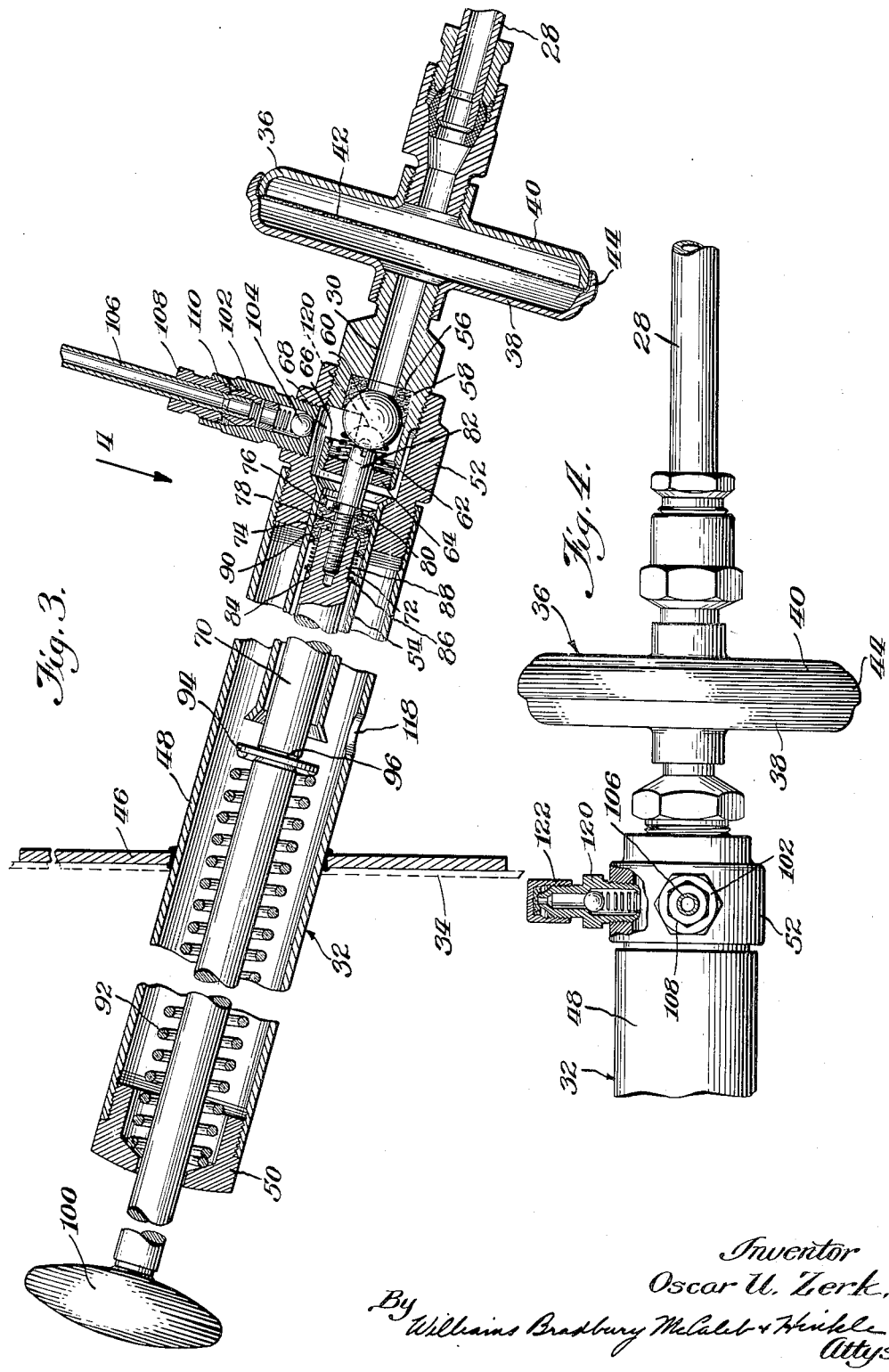
Inventor
Oscar U. Zerk,
By Williams Bradbury McCaleb & Hinkle
Attys.

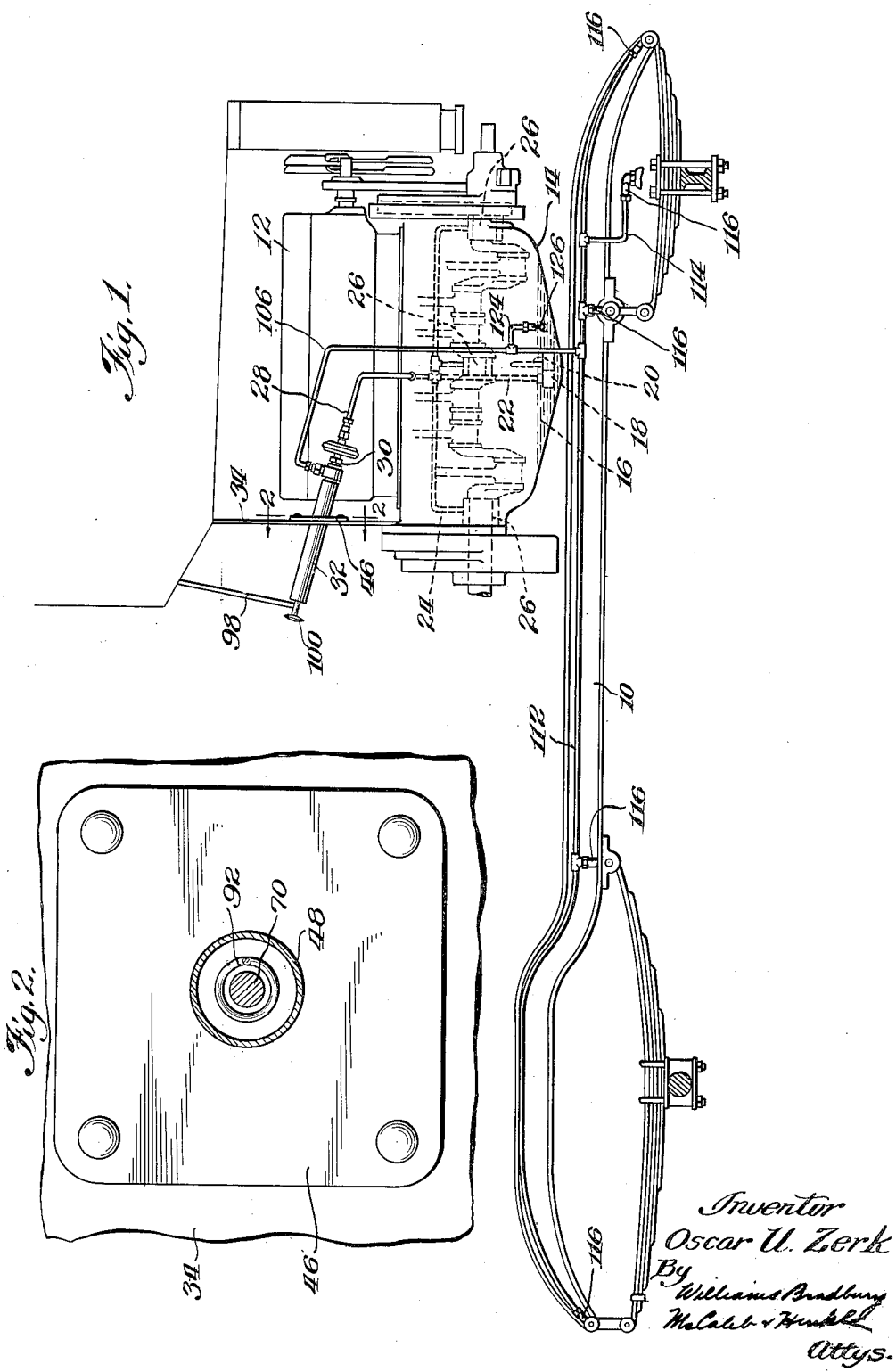

Patented May 9, 1933

1,908,468

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING APPARATUS

Application filed January 24, 1929. Serial No. 334,684.

My invention pertains to lubricating apparatus and more particularly to so-called centralized systems wherein lubricant from a central source is forced through a piping system to a plurality of bearings requiring lubrication and wherein metering means are located adjacent the bearings to insure that each bearing supplied by the system receives its proper amount of lubricant. My invention is illustrated and described as applied to an automobile and is particularly adapted for such application, but it is to be understood that my invention is not limited to such application and may be used for various purposes.

An object of my invention is to provide a new and improved lubricating system.

Another object is to provide a lubricating system wherein the lubricant which is used to lubricate parts of the machine not connected with my system forms the source of supply for lubricating the bearings connected with my system.

Another object is to provide a lubricating system particularly adapted for lubricating the chassis bearings of an automobile.

Another object is to provide a lubricating system particularly adapted for lubricating the chassis bearings of an automobile and utilizing the oil in the crank case of the automobile engine as a source of lubricant supply.

Another object is to provide a lubricating system which may be operated with a minimum of manual effort and wherein the parts of the system ordinarily exposed to view are neat and attractive in appearance.

Other objects and advantages will be apparent as the description proceeds.

In the drawings:

Figure 1 is a diagrammatic view illustrating my novel system as applied to an automobile;

Figure 2 is an enlarged section on the line 2—2 of Figure 1;

Figure 3 is an enlarged axial section of the hand pump of Figure 1; and

Figure 4 is a view, mainly in elevation, of a part of the apparatus shown in Figure 3 and looking in the direction of the arrow 4 of the latter figure.

In Figure 1 of the drawings, wherein I have illustrated my lubricating system as applied to an automobile, the reference numeral 10 indicates, generally, the frame of an automobile, and the reference numeral 12 indicates the automobile engine which is shown as raised somewhat above normal position in order to display more clearly the crank case 14 and parts therein.

In accordance with the common practice, the crank case 14 is preferably filled with oil 16 in which is submerged a conventional oil pump 18 which in the drawings is illustrated as a gear type oil pump, but may be a reciprocating type of pump or any other type which will serve the purpose. The oil pump 18 is illustrated as driven by a shaft 20 and discharges oil into a pipe 22 connected to a system of piping 24 leading to the crank shaft bearings 26 and other bearings of the automobile engine.

A pipe 28 connects the engine lubricating system with the inlet 30 of a hand pump 32 extending through the dash 34. Intermediate the inlet 30 and the pipe 28 I preferably locate a strainer 36 consisting of cup-shaped members 38 and 40 and a straining element 42 of fine mesh wire or other suitable material clamped therebetween. The flange 44 of the cup-shaped member 38 extends well beyond the point of greatest diameter of the cup-shaped member 40 and serves to lock these two members together in a unitary whole, as well as firmly clamping the turned over edge of the straining element 42 therebetween.

The hand pump 32 is secured to the dash 34 by means of bolts, screws, or other suitable fastening means, passing through the bracket 46 welded or otherwise attached to the tubular cover 48 threadedly engaging at one end with a combined closure and spring support 50 and at the other end with a cylinder supporting member 52 which carries the pump cylinder 54. The inlet 30 is threadedly secured in one end of the cylinder supporting member 52 and has a shoulder 56 forming a support for an inlet valve seat 58 of leather, cork, fiber, or other suitable material. A ball valve 60 is urged against the valve seat 58 by a light spring 62 resting against a plug 64 threadedly carried by the inner end of the cage 66 which forms a part of the inlet 30 and projects into a valve chamber 68 formed in the cylinder supporting member 52.

The pump plunger comprises a rod 70 having a reduced inner end 72 carrying reversed cup leathers 74 and 76, separated by a metal washer 78. The cup leathers 74 and 76 are clamped to the end of the rod 70 by washers 80 held in place by a shoulder on the stop 82 threaded into the end of the rod 70. A shoulder 84, formed in the rod 70, serves as an abutment for a metal washer 86 against which rests one end of a spring 88, the other end of which presses a diagonal washer 90 against the end of the cup leather 74 and causes this cup leather to maintain an air-tight and lubricant-tight seal with the pump cylinder 54.

A spring 92 is confined between the spring support 50 and a washer 94 located in a groove 96 in the rod 70 and maintains the pump plunger in the position shown in Figure 3 with the end of the stop 82 resting against the ball valve 60.

The outer end of the rod 70 extends to a point just below the automobile instrument board 98, as shown in Figure 1, and is provided with a knob 100 of attractive appearance, which may be readily grasped by the operator of the automobile to actuate the pump 32 and lubricating system of which it forms a part.

Threaded into the cylinder supporting member 52 is a coupling member 102 carrying a check valve 104 and connected to a pipe 106 by means of a nut 108 and compression sleeve 110. The pipe 106 receives the discharge of the pump and, as most clearly shown in Figure 1, this pipe is connected with a pipe 112 extending along the frame 10 and leading to the spring shackles and any other bearings associated therewith which it may be found desirable to lubricate by my centralized lubricating system. At 114 I have indicated a lead connecting the pipe 112 with the bearings associated with the front axle of the vehicle and similar leads may be used to connect the pipe 112 with other bearings or groups of bearings. The lead 114 may be a flexible pipe or a rigid pipe swivelly connected to provide for the motion between the bearings associated with the front axle and the frame of the vehicle.

Metering devices 116 are preferably located in the system at points adjacent the respective bearings in order to make sure that each bearing will receive its proper supply of lubricant. These metering devices may be resistance units of the general type disclosed in my co-pending application, Serial No. 207,609 filed July 22, 1927, or other suitable measuring valves known in the art.

It should be noted that the rear end of the pump cylinder 54 is located forwardly of the dash 46 and any lubricant which leaks past the pump plunger may escape into the engine compartment of the vehicle through an opening 118 located in the sleeve 48 just beneath the rear end of the pump cylinder. This arrangement makes it impossible for the lubricant to find its way into the driver's compartment where it might soil the clothing of the occupants.

As shown most clearly in Figure 4, I preferably thread what is commonly known in the as at a Zerk nipple 120 in to a wall of the cylinder carrying member 52. The inlet end of this nipple is normally protected by a cover 122 which may be removed and a pressure gun applied to the nipple 120 to prime the system or force out any obstacles which may have formed therein.

The operation of my new and improved lubricating sytsem is as follows:

When the engine of the automobile is operated the engine oil pump 18 withdraws oil from the bottom of the crank case 14 and forces this oil to the engine bearings and also through the pipe 28 and strainer 36 to the pump inlet 30. The stop 82 on the end of the pump plunger is forced against the ball 60 by the pressure of the spring 92 and prevents the ball 60 from opening under the pressure created by the engine oil pump 18. When the operator of the vehicle wishes to lubricate the chassis bearings he merely pulls the button 100 toward him thereby withdrawing the pump plunger to the rear end of the cylinder 54 and compressing the spring 92. This withdraws the stop 82 from contact with the ball 60 and the pressure created by the engine oil pump 18 immediately forces this ball from its seat 58 and fills the valve chamber 68 and that part of the cylinder 54 in front of the plunger with lubricant. It will thus be seen that the operator need exert only sufficient force to compress the spring 92 and that the valve chamber 68 and pump cylinder 54 are filled with lubricant by the engine oil pump without requiring any suction lift by the pump plunger.

The check valve 104 is under sufficient tension to prevent the engine oil pump 18 from forcing oil into the pipe 106 and other pipes connected thereto, and it is only when the pump plunger is returned by the spring 92 and increases the pressure on the oil in the pump cylinder 54 and valve chamber 68 that the check valve 104 opens and permits the oil to pass into the pipe 106 and thence to the bearings. Thereupon the metering devices 116 located adjacent the bearings apportion the total quantity of oil supplied by the pump 32 among the various bearings in accordance with their respective needs.

When my lubricating system is used with measuring valves of the types disclosed in my aforementioned application, I preferably provide my lubricating system with a bleeder 124 leading to the engine crank case. This bleeder has a resistance unit 126 located therein which offers sufficient resistance to insure operation of the measuring valves and thereafter permits complete return of the pump plunger and then relieves the pressure in the system to permit return of the piston valves in the measuring valves.

It is to be understood that my invention is not limited to the details illustrated in the drawings but that various changes may be made therein without departing from my invention, and that the scope of my invention is limited only by the following claims. Having thus illustrated and described a preferred embodiment of my invention, what I claim and desire to secure by United States Letters Patent is:

1. In lubricating apparatus of the class described, a source of lubricant supply, a low pressure pump fed therefrom, a high pressure pump having an inlet connected to the discharge of said low pressure pump, a check valve in said inlet, a resilient drive for said high pressure pump normally holding said check valve closed against the pressure of said low pressure pump, and a piping system connecting said high pressure pump with a bearing to be lubricated.

2. In a centralized lubricating system of the class described, a source of lubricant supply, a low pressure pump fed therefrom, a high pressure pump having an inlet connected to said low pressure pump, a valve chamber in said inlet, a valve in said chamber and normally closing said inlet, a piston in said high pressure pump, a spring for driving said piston in lubricant discharging direction, said piston having a part for contacting with said valve to hold said valve on its seat against the pressure developed by said low pressure pump and to permit movement of said piston in one direction, and a pipe connecting said high pressure pump with a bearing to be lubricated.

3. In a lubricating system, a lubricant pump having an inlet adapted to be connected with a source of lubricant supply under moderate pressure, a check valve for closing said inlet, a piston urged against said check valve by a spring and serving to hold said check valve closed against the pressure of the lubricant at said inlet, and manually controlled means for withdrawing said piston from said check valve to permit filling of said pump with lubricant from said source.

4. In a lubricating system of the class described, a source of lubricant supply, a power driven pump for discharging said lubricant at moderate pressure, resiliently operated means adapted to receive lubricant discharged from said pump under the pressure thereof, a spring operated piston adapted to increase the pressure of lubricant discharged from said power driven pump, said spring operated piston contacting with said valve to hold said valve in a closed position.

In witness whereof, I hereunto subscribe my name this 21 day of January 1929.

OSCAR U. ZERK.